Feb. 27, 1968    C. R. BANTHIN ET AL    3,370,829
GAS TURBINE BLADE CONSTRUCTION
Filed Dec. 20, 1965    2 Sheets-Sheet 1
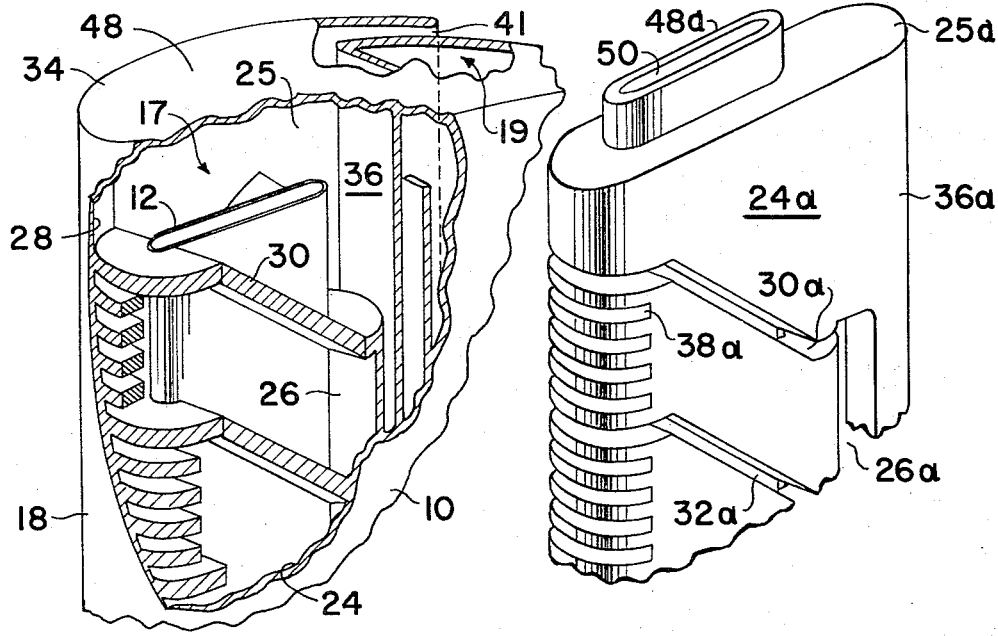
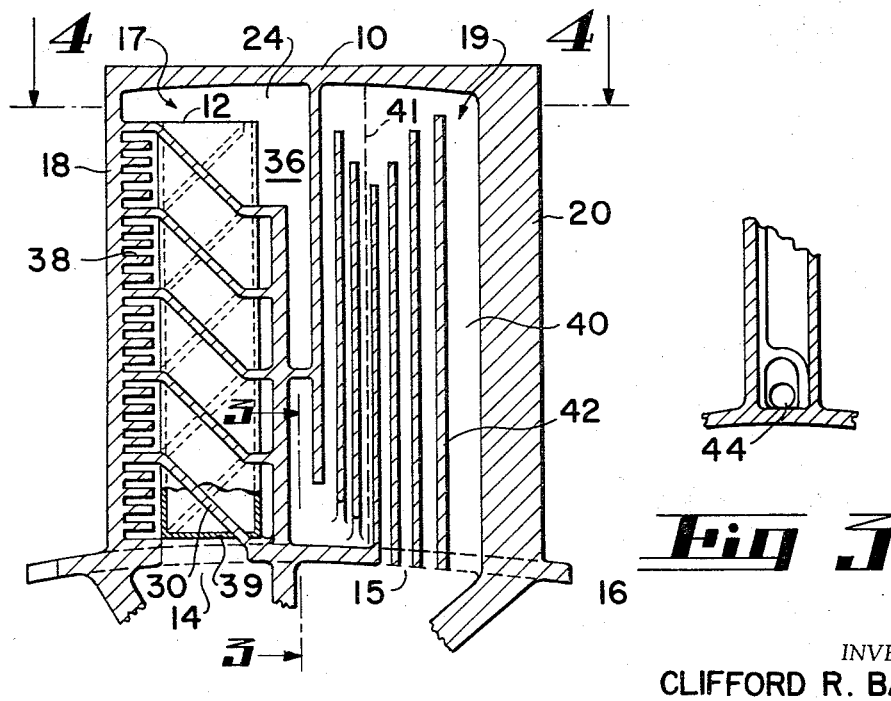
INVENTORS.
CLIFFORD R. BANTHIN
RICHARD D. SEMPLE
ATTORNEYS.

United States Patent Office 3,370,829
Patented Feb. 27, 1968

3,370,829
GAS TURBINE BLADE CONSTRUCTION
Clifford R. Banthin, Redding, Conn., and Richard D. Semple, Media, Pa., assignors to Avco Corporation, Stratford, Conn., a corporation of Delaware
Filed Dec. 20, 1965, Ser. No. 514,952
12 Claims. (Cl. 253—39.15)

ABSTRACT OF THE DISCLOSURE

A turbine blade is constructed with an internal spiral air passage formed by an internal spiral ramp which is cast integrally with the turbine blade. A spiral passageway is formed by the ramp in combination with a uniform diameter insert.

---

This invention relates to gas turbine blades and to the internal construction of the blade for providing coolant passages and to the method for making the same.

In general, this invention comprises a turbine blade having an internal spiral air passage formed from an integral casting and a simple fabricated insert. The casting provides an internal blade structure having at least one opening in which spiral ramps are integrally cast. The ramps, in combination with the fabricated insert, define spiral passageways for the passage of coolant air radially from the hub of the blade to its tip. Also integral with the turbine blade and in the spiral path adjacent the leading edge of the blade are integrally cast fins to provide additional cooling at the hottest portions of the blade.

The object of any turbine blade cooling arrangement is to allow safe operation of the turbines in high temperature gas streams. Without cooling, the high operating temperatures presently encountered would cause the turbine blades to melt even when made of the most advanced alloys in practical use today. Cooling of the blade with compressor discharge air is most desirable because of the readily available coolant supply and its location. However, there are several limitations in air coolant systems resulting from the low specific coolant capacity and the generally modest heat flux values achievable in the small spaces afforded inside turbine blades. Furthermore, the attractiveness of any turbine blade cooling design is dependent on how well the cooling arrangement is optimized without sacrificing mechanical integrity of the blade or requiring undue fabrication complexity.

Since turbine blades operate in high temperature gas streams of high velocity and turbulence, a high heat flux is created in the blade, with the most severe heating occurring at the leading edge of the blade. Thus, the coolant arrangement inside the blade must achieve not only proper over-all levels of cooling, but must achieve higher degrees of cooling in local areas where the heating effect is more concentrated. Additionally, care must be taken to supply ample coolant to local hot areas to avoid overheating the coolant itself. However, since the amount of coolant used is a critical factor in over-all engine performance, care must be taken to avoid excess usage of air in other areas of lesser heating so as to maintain a high air utilization factor.

The primary object of this invention is to provide internal cooling for a turbine blade.

Another object of this invention is to provide a gas turbine blade having a radially extending opening, at least one spiral ramp on the internal walls of the blade surrounding the opening, and a center body extending through the opening in contact with the ramp for defining a passageway through which coolant air is passed.

Still another object of this invention is to provide a turbine blade having an internal passageway formed of an integral casting plus a fabricated insert for providing a coolant passageway, said integral casting including a spiral ramp and a plurality of fins located at the hot leading edge of the turbine blade.

For a better understanding and for other objects and advantages of this invention, reference should now be made to the following specification and to the accompanying drawings in which:

FIGURE 1 is a perspective view, partially broken away, of a portion of a turbine blade constructed in accordance with this invention;

FIGURE 2 is a sectional view of the blade;

FIGURE 3 is a sectional view taken through the line 3—3 of FIGURE 2;

FIGURE 5 is a perspective view showing a portion of a ceramic core utilized in casting the turbine blade illustrated in FIGURE 1.

Figure 4:
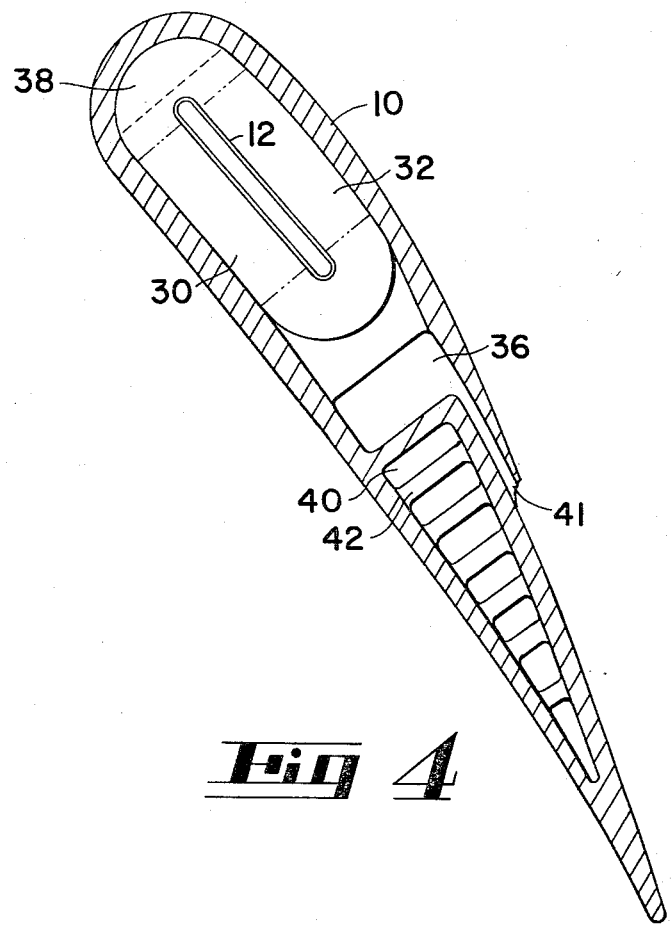
FIGURE 4 is a sectional view taken through the line 4—4 in FIGURE 2.

The turbine blade is made in two parts, a main body 10 which is cast in a mold, and a center body 12 fabricated of sheet metal and brazed in place to the main body 10. The main body 10 is generally hollow and is provided with air coolant openings 14 and 15 located in the hub 16 of a turbine wheel to which the blades are affixed.

The hollow interior of the forward section 17 of the main body 10 (adjacent the leading edge 18) is provided with a plurality of cast partitions which, together with the center body 12, define a plurality of spiral passageways of rectangular cross section in communication with the opening 14. It is the construction of the forward section 17 of the blade with which this invention is particularly concerned. The hollow interior of the aft section 19 of the interior of the main body (adjacent the trailing edge 20) is provided with a plurality of integrally cast air coolant passageways communicating with the opening 15. The construction of the aft section 19 is somewhat conventional.

In casting the turbine blade, the hollow interior of the forward portion assumes a generally rectangular cross section having straight interior side walls 24 and 25, and generally semicircular interior end walls 26 and 28. In a particular application, the forward interior end wall will not necessarily be a true semicircle, but would conform generally to the shape of the blade.

The interior walls are provided with two integrally cast ramps, the first ramp 30 commencing at the hub 16 on the wall 24, and the second ramp 32 commencing at the hub 16 on the wall 25. The ramps 30 and 32 proceed spirally and radially (with respect to the turbine wheel) from the hub 16 toward the tip 34 of the blade, terminating at a manifold 36 within the hollow body 10. The radial projection of the inner edges of each of the ramps defines a central volume which is generally rectangular but which has two semicircular ends. The sheet metal center body 12 has the same configuration and, when installed within the central volume, contacts the entire length of the inner edges of the ramps 30 and 32. Thus, the center body 12, in combination with the ramp 30, defines one spiral passageway leading from the opening 14 to the manifold 36, while the spiral ramp 32, in combination with the center body 12, defines a second spiral passageway paralleling the first. The end of the center body 12 adjacent the opening 14 is closed by an end wall 39.

Also integrally cast inside the hollow body 10, immediately adjacent the leading edge 18 on interior wall 28 of the turbine blade, is a plurality of fins 38.

The blade has a radially extending slot 41 communicating between the manifold 36 and the exterior. The slot 41 extends from just below the tip 34 to just above the hub 16 and is cut in the blade after casting.

The aft section 19 of the blade is also provided with a plurality of radial passageways 40 defined by a plurality of integrally cast partitions 42, having openings 44 communicating with the lower portion of slot 41.

Coolant air is introduced into the hollow body 10 of the blade at the openings 14 and 15. The coolant air entering at 14 follows the two parallel spiral paths, both of which terminate at the manifold 36. The air reaching the manifold 36 then exits through the slot 41 over the blade surface and the trailing edge 20 in the normal direction of gas flow. Air entering at 15 passes through the passageways 40 and similarly exits at the slot 41.

It will be noted that the fins 38 located immediately adjacent the leading edge 18 of the blade, where the heat flux is very large, produce turbulence in the flow of the coolant air. This results in a large heat transfer film coefficient while also providing an extended heat transfer surface to dissipate the heat. The 180° bend around the center body will in itself contribute to higher film coefficients in that area. Thus, the disclosed structure provides for the passage of coolant air ultimately through the high flux leading edge region and the lesser heat flux aft section, thereby achieving generally cooler air and greater cooling rates at the critical leading edge section.

The spiraling of the passageway provides for several 180° turns of the coolant, thereby creating higher cooling film coefficients than could be achieved with straight-through flow. The fins, which are cast into the main body adjacent the leading edge, give high density, extended cooling surfaces and, in addition, create a desirable flow disturbance to the local flow interrupting positioning. The air flow passages provided by the spiral ramps 30 and 32 and the center body 12 are long and tortuous with comparatively small cross sectional flow area. This has the effect of creating high flow velocities over longer flow paths, which make for good cooling effectiveness and high utilization of coolant air. The structure provided has mechanical integrity and, in addition to casting, requires only simple fabrication of the center body 12.

The method for constructing the novel turbine blade of this invention is best illustrated by reference to FIGURE 5, in which is shown a ceramic core having a configuration conforming to the inverse of the interior of the blade 10. That is, the ceramic core has a generally rectangular cross section with semicircular ends having straight sides 24a and 25a corresponding to the interior walls 24 and 25 of the turbine blade. Grooves 30a and 32a, corresponding to the ramps 30 and 32, are formed within the core to a depth defining the external dimensions of the center body 12. Grooves 38a in the ceramic core correspond to the fins 38, while the extension 36a corresponds to the manifold 36. The space 26a corresponds to the end wall 26 formed within the body.

An additional extension 48a in the core defines an opening 48 in the tip of the turbine blade corresponding in size and configuration to the center body 12. The opening 48 permits the insertion of the center body into the interior of the blade in position for brazing after the main body 10 has been cast. The opening 48 is then closed by any conventional means. The core may be hollowed as at 50 to reduce the material required and to improve leaching.

The entire core of FIGURE 5 (along with an additional core representing the conventional passageways 40) is placed in a mold defining the outer configuration of the blade. After the blade is poured, the core is leached out with a suitable acid, leaving the structure illustrated in FIGURE 1.

One of the advantages of this invention is the ease with which it can be fabricated. It will be noted that the ceramic core has a constant cross section along its entire length. This cross section is essentially a rectangle with semicircular ends, and thus there are no difficult contours or tapering surfaces to work with.

The core spans the full length of the blade, the extension 48a serving as a peg where it protrudes through the tip of the blade. Thus, the core follows a straight run and can be supported at both ends. This gives strength to the core and permits accurate positioning within the blade. The hollowing of the ceramic core as at 50 is accomplished without any series compromise to strength and allows free access of the leaching acids to all areas of the core after casting.

Many modifications and adaptations will at once become apparent to persons skilled in the art. For example, while the leading edge 18 of the blade is pictured as semicircular with fins 38 only in that area, other shapes are equally practicable, depending upon the desired blade characteristics. Furthermore, fins may be placed in other areas of the blade. Also, while two spiral passageways have been illustrated, the blade may be constructed with a single passageway or with three or more passageways. The arrangement to be used depends on the advantages that the different geometries give to the cooling performance in heat flux, the coolant air quantities required, and the pressure drop available to drive the coolant air.

The invention has been described in connection with a turbine blade. The term "turbine blade" is equally applicable to the rotating blades as well as the stator blades of a turbine.

It is intended therefore that this invention be limited only by the appended claims as interpreted in the light of the prior art.

What is claimed is:

1. In a turbine blade having a hollow forward section adjacent its leading edge, an aft section adjacent its trailing edge, and an opening in said blade at its hub, the combination comprising:
    a continuous spiral ramp on the internal walls of the hollow forward section of said turbine blade, said spiral ramp extending radially from the opening at its hub toward the tip of said blade, said ramp being integrally cast with said turbine blade walls, the radial projection of the internal edge of said continuous spiral ramp defining a center volume; and
    a center body in said central volume in continuous contact with said ramp, said ramp, said internal walls, and said center body defining a continuous spiral passageway.

2. The invention as defined in claim 1, and a radial slot extending through said blade, said slot communicating between said passageway and the exterior of said blade to provide an exit for coolant air entering the opening in said turbine blade.

3. The invention as defined in claim 1, and a manifold in said hollow forward section, said manifold communicating with said passageway;
    and a radial slot extending through said blade, said slot communicating between said manifold and the exterior of said blade to provide an exit for coolant air entering the opening in said turbine blade.

4. The invention as defined in claim 2 wherein said radial slot is cut in a plane extending in the normal direction of gas flow for directing exiting coolant air over said trailing edge.

5. The invention as defined in claim 4, and a plurality of cooling fins integrally cast with said turbine blade on the internal wall of said turbine blade adjacent said leading edge.

6. The invention as defined in claim 5, and a plurality of radial passageways in said aft section, said plurality of radial passageways communicating with said radial slot; and
    an opening at said hub to said plurality of passageways.

7. The invention as defined in claim 6 wherein said central volume is of uniform cross section along its radial length.

8. The invention as defined in claim 1 wherein a plurality of ramps are on said internal walls, said plurality of ramps and said center body defining a plurality of continuous spiral passageways.

9. The invention as defined in claim 8, and a radial slot extending through said blade, said slot communicating between said passageways and the exterior of said blade to provide an exit for coolant air entering the opening in said turbine blade.

10. The invention as defined in claim 8, and a manifold in said hollow forward section, said manifold communicating with said plurality of continuous spiral passageways; and a radial slot extending through said blade, said slot commuicating between said manifold and the exterior of said blade to provide an exit for coolant air entering the opening in said turbine blade.

11. The invention as defined in claim 10, and a plurality of cooling fins integrally cast with said turbine blade on the internal wall of said blade adjacent said leading edge.

12. The invention as defined in claim 11 wherein said central volume is of uniform cross section along its radial length.

References Cited

UNITED STATES PATENTS

| 3,220,697 | 11/1965 | Smuland et al. | 253—39.15 |
| 3,246,469 | 4/1966 | Moore | 253—39.15 |

FOREIGN PATENTS

| 853,534 | 10/1952 | Germany. |
| 651,830 | 4/1951 | Great Britain. |
| 728,834 | 4/1955 | Great Britain. |

EVERETTE A. POWELL, JR., *Primary Examiner.*

UNITED STATES PATENT OFFICE

CERTIFICATE OF CORRECTION

Patent No. 3,370,829                                                 February 27, 1968

Clifford R. Banthin et al.

It is hereby certified that error appears in the above numbered patent requiring correction and that the said Letters Patent should read as corrected below.

Column 1, line 53, for "coolant" read -- cooling --; column 3, line 71, for "rectangule" read -- rectangle --; column 4, line 4, for "series" read -- serious --; line 38, for "center" read -- central --; column 5, line 9, for "commuicating" read -- communicating --.

Signed and sealed this 27th day of May 1969.

(SEAL)
Attest:

Edward M. Fletcher, Jr.
Attesting Officer

Commissioner of Patents